United States Patent [19]

Kato

[11] Patent Number: 4,508,189
[45] Date of Patent: Apr. 2, 1985

[54] MOTORCYCLE

[75] Inventor: Hiromi Kato, Iwata, Japan

[73] Assignee: Yamaha Hatsudoki Kabushiki Kaisha, Japan

[21] Appl. No.: 403,927

[22] Filed: Aug. 2, 1982

[30] Foreign Application Priority Data

Aug. 3, 1981 [JP] Japan ............................... 56-121734

[51] Int. Cl.³ ............................................. B62D 61/02
[52] U.S. Cl. .................... 180/219; 123/59 PC; 123/432; 123/583; 123/584; 180/227; 261/23 A; 261/41 D; 261/44 B
[58] Field of Search ............... 180/219, 227; 123/432, 123/583, 584, 59 PC; 261/23 A, 44 B, 41 D; 60/600–605

[56] References Cited

U.S. PATENT DOCUMENTS

| 3,272,483 | 9/1966 | Martin ............................... 261/23 A |
| 3,556,060 | 1/1971 | Henry-Biabaud ................... 124/432 |
| 3,784,172 | 1/1974 | Sato et al. ......................... 123/59 PC |
| 3,852,379 | 12/1974 | Shishido et al. ................... 261/23 A |
| 4,041,797 | 8/1977 | Mito ............................... 261/44 B X |
| 4,044,080 | 8/1977 | Matsumoto et al. ............... 261/44 B |
| 4,257,374 | 3/1981 | Matsumoto et al. ................. 123/432 |
| 4,317,438 | 3/1982 | Yagi et al. ......................... 123/432 |
| 4,319,553 | 3/1982 | Endo ........................... 123/59 PC X |
| 4,323,135 | 4/1982 | Tominaga et al. .......... 280/281 R X |
| 4,347,909 | 9/1982 | Takemura et al. .................. 180/219 |
| 4,356,877 | 11/1982 | Kamiya ............................... 180/227 |
| 4,380,516 | 4/1983 | Matsuzaka ....................... 261/23 A |

FOREIGN PATENT DOCUMENTS 52-147957  5/1977  Japan .

Primary Examiner—David M. Mitchell
Assistant Examiner—Mitchell J. Hill
Attorney, Agent, or Firm—Ernest A. Beutler

[57] ABSTRACT

Several embodiments of improved compact motorcycle configurations. In each embodiment, a single suspension element is provided for the rear wheel that extends generally in the longitudinal center plane of the motorcycle. In accordance with each embodiment, plural intake passages serve each chamber of the engine to permit the use of a smaller more compact induction system. Separate carburetor barrels serve each intake passage. In one embodiment, the intake passages communicate with the chamber through separate intake ports and in another embodiment, the intake passages serve the chamber through a common intake port.

9 Claims, 6 Drawing Figures

MOTORCYCLE

BACKGROUND OF THE INVENTION

This invention relates to a motorcycle and more particularly to an improved induction system for a motorcycle that permits a compact arrangement with a highly effective intake system.

As is well known, motorcycles offer considerable design problems because of their relatively small size and compact nature. That is, the components of the motorcycle must be designed so as to achieve their intended purpose in a facile manner while at the same time avoiding intrusion with the other components of the motorcycle and their function.

As a specific example, it has been proposed to employ a suspension for the rear wheel of the motorcycle in which a single suspension element (normally a combined spring, tubular shock absorber) is employed. In order to employ such a single suspension element for the rear suspension, it is desirable if not necessary to place this suspension element on or near a plane passing through the longitudinal center of the motorcycle. As a result, the suspension element must be positioned at least in part beneath the motorcycle seat. However, the engine is also located in this area and frequently the engine induction system including the carburetor extends to the rear of the engine and in proximity to the suspension element. As a result, the induction system must clear the suspension element and these two components should not interfere with the operation of the other.

One way of avoiding such interference would be to position the engine at a lower than desired level in the motorcycle. Such lowering of the engine, however, has the effect of reducing the ground clearance of the motorcycle. Alternatively, interference between the induction system and specifically the carburetor and the suspension element may be avoided by shortening the overall height of the engine. This also gives rise to problems, particularly if it is desirable to use an engine of large displacement. Such large displacement engines, particularly if of the single cylinder four-cycle type, occupy considerable space and their induction system may well interfere with a suspension element of the type wherein a single suspension element is employed for the rear wheel of the motorcycle.

In addition to the aforenoted problems, it is the common practice to employ a carburetor for motorcycle engines of the sliding piston throttle valve type. With a large displacement engine, the carburetor itself also has a large displacement and large bore and hence the sliding piston throttle valve requires additional clearance. This, of course, further aggrevates the problem of positioning all of the components in such a location that they can operate efficiently and without interference from the others.

In addition to the problem of providing clearance between the various components and optimum operation, the arrangements as aforedescribed can cause the carburetor of the engine to be positioned in a location wherein servicing is extremely difficult. That is, if the engine is raised to such a level as to provide the desired ground clearance and if the carburetor is positioned so as to clear the suspension element, the carburetor itself may be positioned in a relatively inexcessible location with prior art type of induction systems.

It is, therefore, a principal object of this invention to provide an improved motorcycle configuration wherein maximum power can be achieved and the components will not interfere with each other.

It is another object of the invention to provide an improved induction system for a motorcycle having a rear suspension that embodies a single suspension element without sacrificing ground clearance or engine performance.

It is another object of this invention to provide a compact, high efficiency induction system for a motorcycle.

SUMMARY OF THE INVENTION

This invention is adapted to be embodied in a motorcycle having a rear wheel, a suspension for supporting the rear wheel for relative movement that includes a single suspension element extending generally in the longitudinal center plane of the motorcycle, a seat supported at least in part above the suspension element and an engine disposed forwardly of the rear wheel and having a combustion chamber. In accordance with the invention, the engine has a pair of induction passages each serving the combustion chamber. The induction passages lie in side-by-side relationship and extend rearwardly from the engine toward the rear wheel. Charge forming means are provided for delivering a charge to each of the induction passages.

DETAILED DESCRIPTION OF THE PREFERRED EMBODIMENTS

Figure 1:
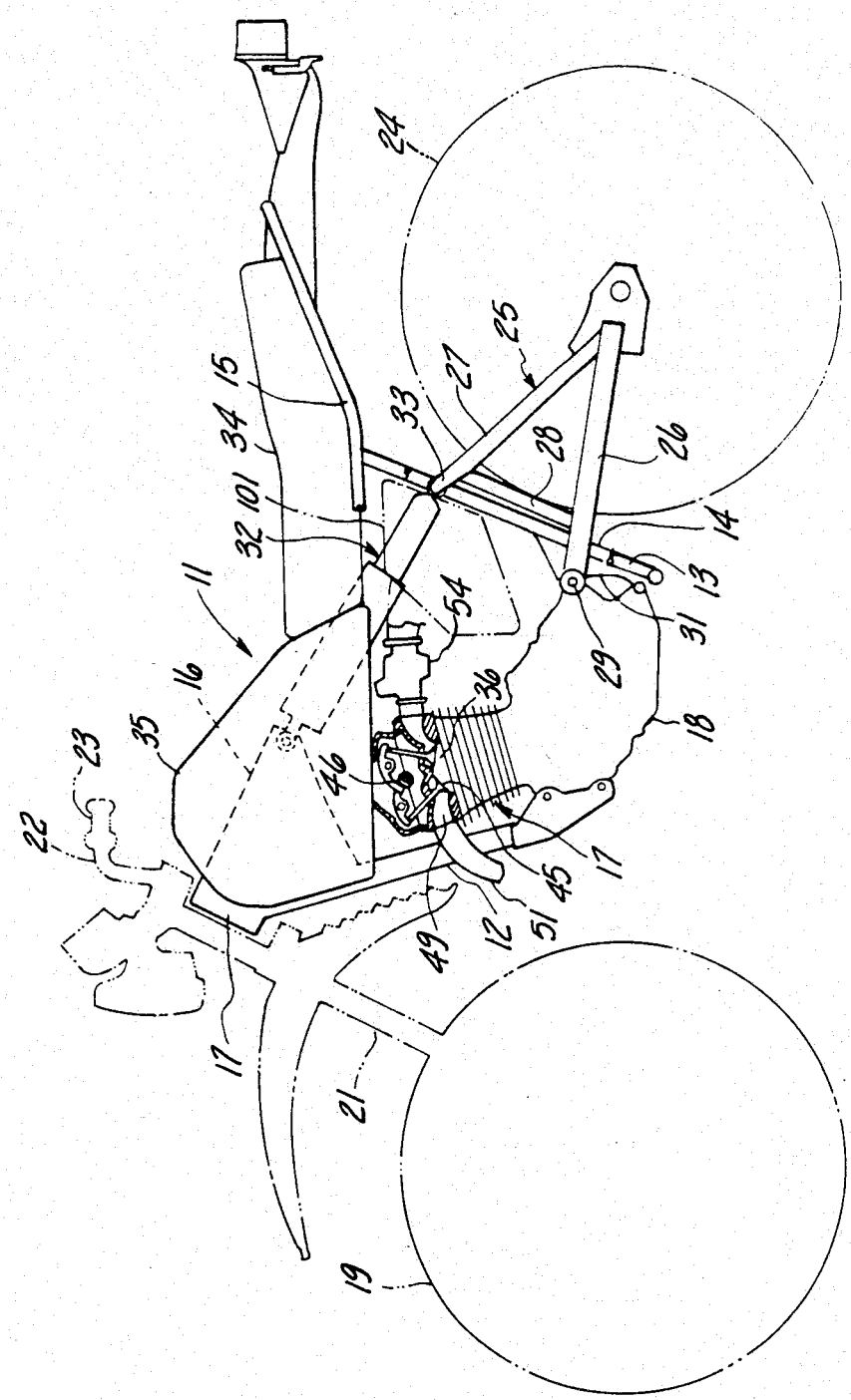
FIG. 1 is a side elevational view of a motorcycle constructed in accordance with a first embodiment of the invention, with portions broken away and with other portions shown in phantom.
Figure 2:
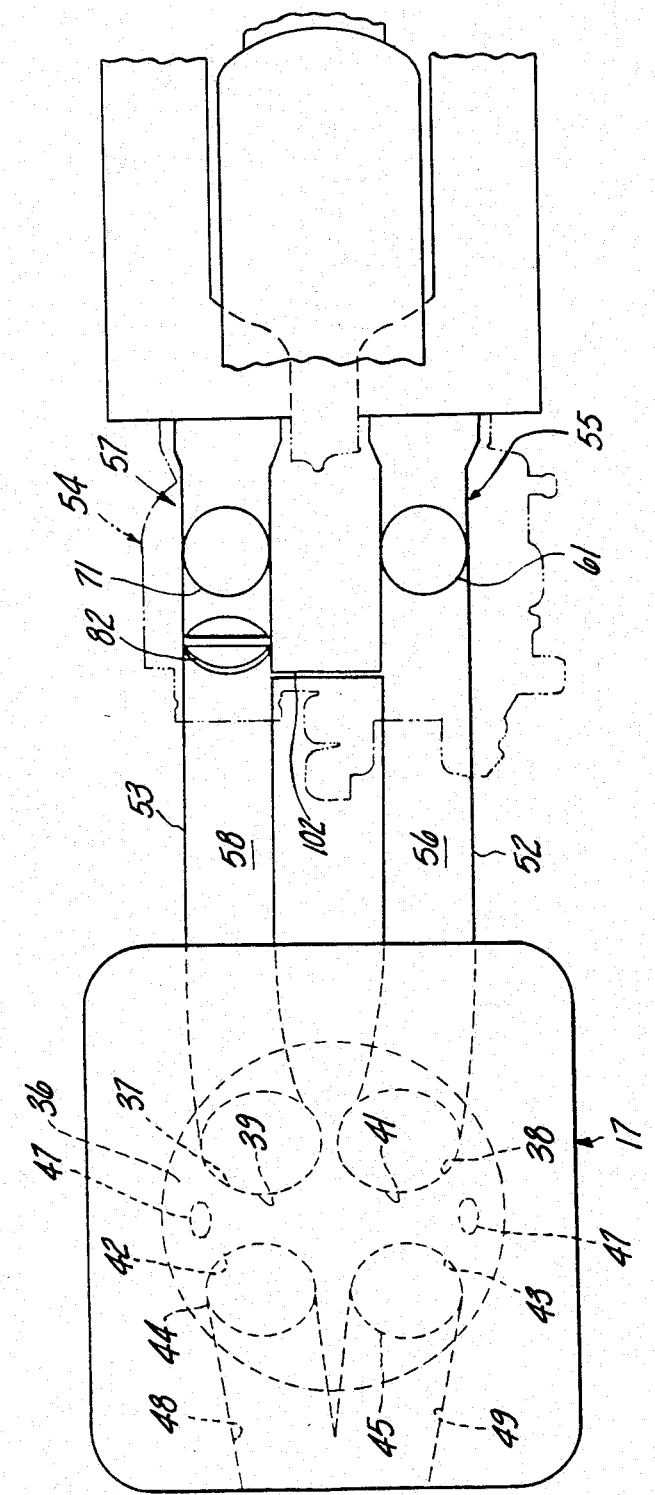
FIG. 2 is a partially schematic, top plan view on an enlarged scale of the engine and induction system of the embodiment of FIG. 1.

Referring first to FIGS. 1 and 2, a motorcycle constructed in accordance with the first embodiment of this invention is identified generally by the reference numeral 11. The motorcycle 11 includes a frame consisting of a down tube 12, a pair of spaced right and left back tubes 13 and 14 and a pair of spaced seat rail tubes 15 (only one of which appears in the drawings). The seat rail tubes 15 are each affixed as by welding to the upper ends of the back tubes 13 and 14 in a known manner. In addition, a bracket 16 is affixed to the forward end of the down tube 12 via a head pipe 17. The forward ends of the seat rail tube 15 are fixed, as by welding, to the bracket 16. The remaining components of the frame will not be described in any detail and it is to be understood that the construction of the frame generally may take any of the known forms in this art.

An engine, indicated generally by the reference numeral 20, is supported within the frame and in the illustrated embodiment the engine 20 has a crankcase 18 that is affixed to the down tube 12 and the back tubes 13 and 14 so as to form a structural part of the frame assembly.

A front wheel, shown in phantom and indicated generally by the reference numeral 19, is supported by means of a suspension system (not shown) on a front fork 21 which, in turn, is rotatably journalled for steering movement by the head pipe 17. A handlebar 22 is affixed to the front fork 21 in a known manner and carry handle grips 23 at their outer ends, one of which may constitute an accelerator grip.

A rear wheel 24 is journalled by means of a pair of triangular frame assemblies, indicated generally by the reference numeral 25, positioned at each side of the wheel 24. Each frame assembly includes a generally horizontally extending member 26 and an inclined member 27 with the frame assemblies at each side being interconnected by means including a briding member 28. Each frame assembly 25 is pivotally supported at its forward end by means of a pivot pin 29 that is carried by a bracket 31 that is affixed to the crankcase 18.

The pivotal movement of the wheel 24 and frame assemblies 25 relative to the motorcycle frame is controlled by means of a single suspension element, indicated generally by the reference numeral 32 that is positioned generally on the longitudinal center plane of the motorcycle 11. The suspension element 32 may, in a preferred form of the invention, take the form of a combined tubular shock absorber and surrounding coil spring assembly. One end of the suspension element 32 is pivotally connected to the frame assemblies 25 by means of a suitable connection to the interconnecting part 33 of the angular members 27 of the frames 25 on each side of the wheel 24. The forward end of the suspension element 32 is pivotally connected to the bracket 16 at its trailing end in a known manner.

A seat 34 is carried by the seat rails 15 and overlies at least in part the rearward portion of the suspension element 32. A fuel tank 35 of generally saddle shape is carried by the bracket 16 in front of the seat 34 and in partial overlying relationship to the suspension element 32. It should be noted that the suspension element 32 extends generally above the engine 20.

The engine 20, in the illustrated embodiment, is of the reciprocating, single cylinder type and has a combustion chamber 36 that is served by a pair of intake ports 37 and 38 and cooperating intake valves 39 and 41. Also serving the chamber 36 are a pair of exhaust ports 42 and 43 and cooperating exhaust valves 44 and 45. The intake valves 39 and 41 and the exhaust valves 44 and 45 are all operated by means of a single overhead camshaft 46 via rocker arms in a known manner.

A pair of spark plugs 47 are positioned on diametrically opposite sides of the combustion chamber 36 between the intake valve 39 and exhaust valve 44 and the intake valve 41 and the exhaust valve 45, respectively.

The cylinder head exhaust ports 42 and 43 merge into cylinder head exhaust passages 48 and 49 which, in turn, feed a common exhaust pipe 51 for discharge of the exhaust gases to the atmosphere.

The induction system for the engine 20 includes a pair of intake pipes 52 and 53 that serve the cylinder head intake passages that terminate at the intake ports 38 and 39. A two-stage carburetor, indicated generally by the reference numeral 54, serves the intake pipes 52 and 53. The carburetor 54 has a primary barrel 55 which serves an intake passage 56 of the pipe 52 and a secondary barrel 57 that serves a secondary intake passage 58 of the pipe 53.

Figure 3:
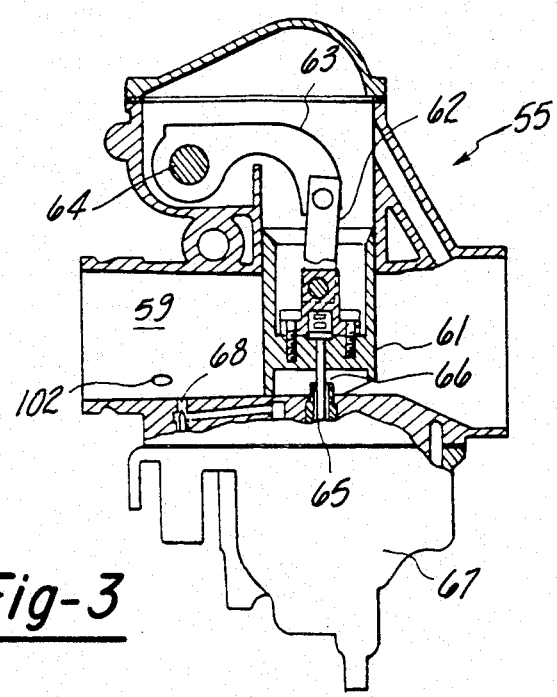
FIG. 3 is an enlarged view, with portions shown in cross section, through the primary barrel of the carburetor of the embodiment of FIG. 1.

Referring now additionally to FIG. 3, the primary barrel 55 includes an intake passage 59 in which a venturi section is formed by means of a sliding piston type of throttle valve 61. The position of the throttle valve 61 is controlled by a link 62 that is pivotally connected at one of its ends to the throttle valve 61 and at its opposite end to an actuating lever 63. The lever 63 is, in turn, affixed to a throttle valve shaft 64 which is rotated in a manner to be described. The piston 61 carries a metering rod 65 that cooperates with a main metering jet 66 to control the flow of fuel from a fuel bowl 67 into the induction passage 59 at an amount determined by the position of the throttle valve 61. In addition, an idle or slow speed fuel discharge port 68 is positioned in the intake passage 59 downstream of the throttle valve 61.

Figure 4:
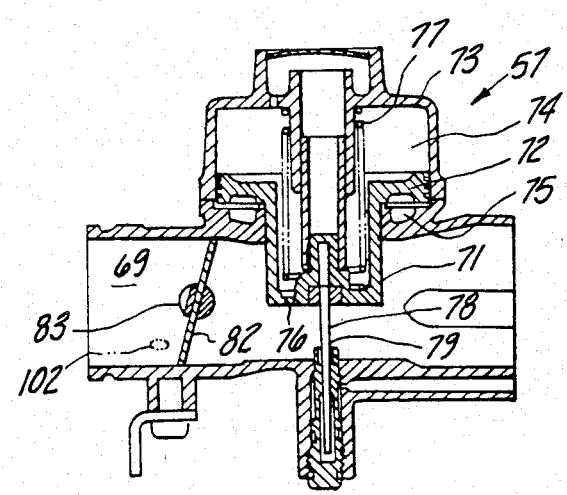
FIG. 4 is a cross-sectional view taken through the secondary barrel of the carburetor of the embodiment of FIG. 1.

Referring now additionally to FIG. 4, the secondary barrel 57 includes an induction passage 69 in which a sliding piston 71 is supported. In this barrel, the sliding piston 71 is controlled automatically to maintain a constant pressure drop across the piston 71. For this purpose, the upper side of the piston 71 is provided with an enlarged piston portion 72 that is received in a housing 73 and which divides the housing into an upper chamber 74 and a lower chamber 75. The upper chamber 74 is exposed to pressure on the downstream side of the piston 71 by means of a pressure sensing port 76 that extends through the lower face of the piston portion 71. The chamber 75 is, on the other hand, exposed to atmospheric pressure or the pressure upstream of the piston 71 through a suitable port (not shown). A spring 77 is contained within the housing 73 and normally urges the piston 71 downwardly to its idle position.

The piston 71 carries a metering rod 78 that cooperates with a main metering jet 79. The main metering jet 79 is positioned at the mouth of a fuel well 81 that is served from the fuel bowl 67 of the primary barrel 55. In this way, it is unnecessary to provide two fuel bowls for the carburetor 54 and, therefore, the carburetor 54 may be made more compact than with prior art type of arrangements.

A manually operated butterfly type throttle valve 82 is positioned in the induction passage 69 downstream of the piston type valve 71. The throttle valve 82 is affixed to a throttle valve shaft 83 and is operated by means of a lost motion connection so that the throttle valve 82 will open at some point after a predetermined opening of the primary throttle valve 61 by means of a linkage system now to be described.

Figure 5:
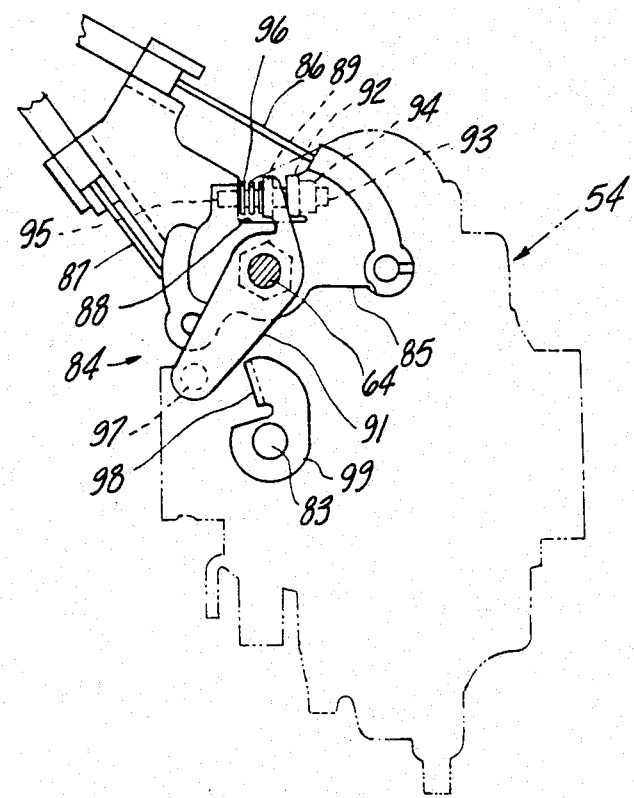
FIG. 5 is a side elevational view showing the throttle linkage system of the carburetor.

A linkage system 84, shown in most detail in FIG. 5, is interposed between the carburetor barrels 55 and 57. The linkage system 84 includes a bell crank 85 that is affixed against rotation to the primary throttle valve shaft 64. A pair of control wires 86 and 87 are affixed to opposite arms of the bell crank 85 and are connected to the accelerator grip 23 for rotation of the throttle valve shaft 64 for manual positioning of the primary throttle piston 61.

The bell crank 85 defines a generally U-shaped recess 88 into which a tang 89 formed at one end of a control lever 91 ends. The control lever 91 is journalled on the primary throttle valve shaft 64. On the rear side of the tang 89, the bell crank 85 is formed with a generally parallelly extending tang 92. A screw 93 is threaded through the bell crank tang 92 and is locked in place by a lock nut 94. The screw 93 is adapted to engage the rear side of the tang 89 and rotate the control lever 91 in a manner to be described.

A guide pin 95 extends from the opposite side of the bell crank gap 88 and is surrounded by a coil compression spring 96 which engages the opposite side of the control lever tang 89 so as to maintain the tang 89 in engagement with the screw 93.

The opposite end of the control lever 91 carries a pin 97 that is adapted to coact with a tang 98 formed on a control lever 99 that is fixed to the secondary throttle valve shaft 83. A torsional spring (not shown) normally biases the control lever 99 in a counterclockwise direction as viewed in FIG. 5 so that the secondary throttle valve 82 will be maintained normally in a fully closed position. The throttle valve 82 is closely fitted to the induction passage 69 (FIG. 4) so as to substantially preclude any flow when it is closed. The pin 97 is normally spaced from the control lever tank 98 in the idle position so as to provide some lost motion in the opening of the throttle valves 61 and 82, as will be described. The amount of this lost motion is determined by the adjustment of the screw 93.

Air cleaners 101 are provided for each of the carburetor barrels 55 and 57 on opposite sides of the suspension element 32 (FIG. 1). The air cleaners 101 supply filtered and, if desired, silenced air to the carburetor 54 and specifically to its barrels 55 and 57.

The operation of this embodiment will now be described by reference to all figures. The figures show the engine as it appears when it is in its idling condition. In this position, the manually operated throttle valve 61 is at its idle position and, as has been noted, the manually operated secondary throttle valve 82 is fully closed. Thus, during this running condition, only the primary carburetor barrel 55 will supply fuel air mixture to the cylinder head intake ports 38 and 37. Both the intake valves 39 and 41 will continue to open and close and to provide some cooling for the secondary intake valve 39, a small transfer passage 102 extends from the primary barrel 55 to the secondary barrel 57 downstream of the respective throttle valves 61 and 82. Thus, a small amount of fuel/air mixture will be delivered to the intake port 37 through this transfer passage 102.

As the accelerator grip 23 is rotated in an opening direction, the bell crank 85 will also be rotated in a counterclockwise direction as viewed in FIG. 5 and the primary throttle piston 61 will begin to open. The metering rod 65 will increase the fuel flow as the air flow is increased due to opening of the primary throttle valve 61. Until the pin 97 contacts the control lever tang 98, however, the secondary throttle valve 82 will be held closed. As has been previously noted, the amount of lost motion or delay before opening of the secondary throttle valve 82 is adjusted by the screw 93. During this continued opening of the primary throttle valve 61, a small amount of fuel/air mixture will continue to be delivered to the secondary cylinder head intake port 37 by the transfer passage 102.

Once the pin 97 contacts the control lever tang 98, continued opening of the primary throttle piston 61 will cause opening of the secondary throttle valve 82. When this occurs, the piston 71 will seek a position to maintain a constant pressure drop across the induction passage 69 and the metering rod 78 will appropriately control the fuel discharge. Thus, additional fuel/air mixture will be delivered to the engine chamber 36 through both of the intake ports 38 and 37.

It should be readily apparent that this embodiment of the invention provides good maximum power output by providing sufficient fuel/air flow while at the same time permits the use of smaller intake passages and smaller carburetors barrels for each intake passage. Therefore, the carburetor barrels 55 and 57 may be conveniently positioned without interference from the adjacent suspension element 32. Also, it is possible to use piston type throttle valves without interference with the suspension element 32 or the lower portion of the seat 34. In addition, because of the use of the staged throttle valves, a high velocity of the intake charge may be achieved even at low engine speeds so as to insure good fuel economy and efficient control of unwanted exhaust gases. In addition, the use of the transfer passage 102 insures against any damage to the intake valve 39 and against the accumulation of carbon deposits even under low speed running. The compact construction also permits the carburetor 54 to be positioned so that it can be serviced and adjusted easily and without removal of other components of the motorcycle. This compactness is further achieved through the use of a single fuel bowl 67 for both barrels 55 and 57.

Figure 6:
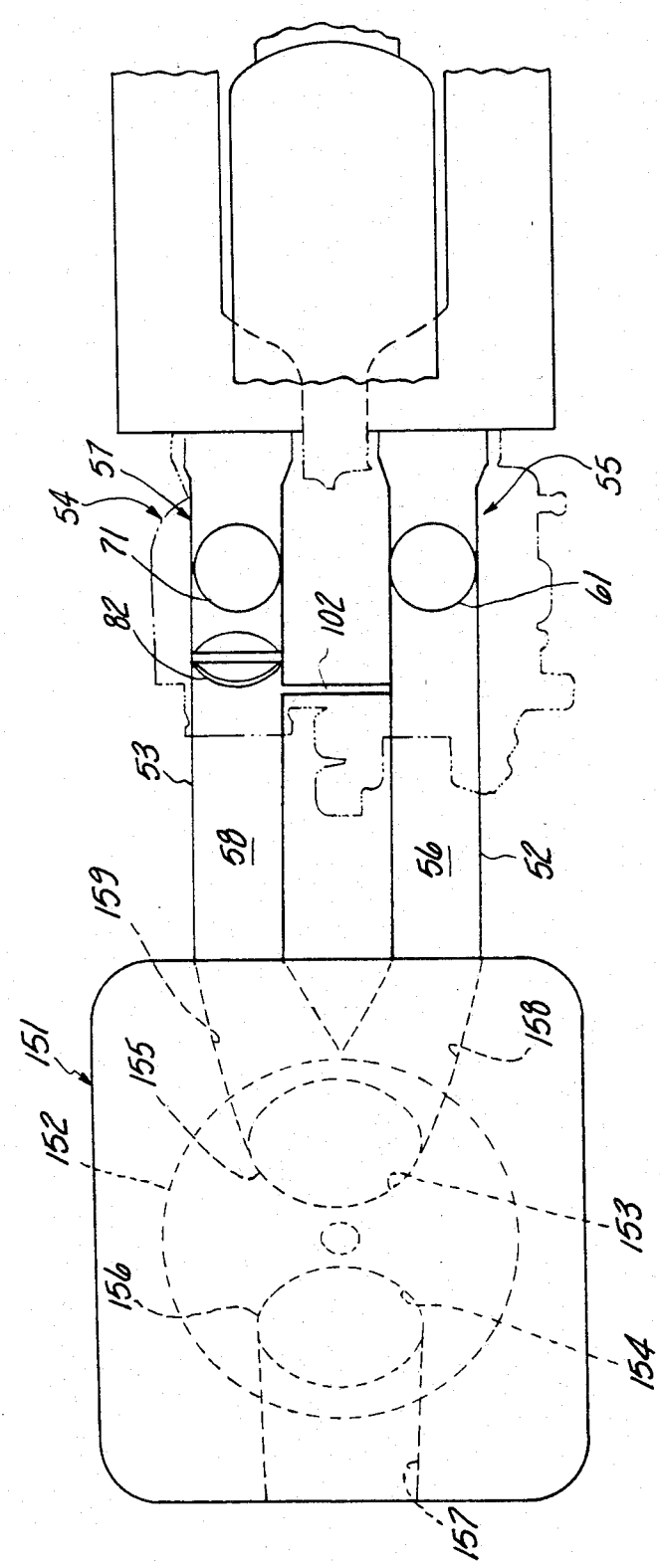
FIG. 6 is a partially schematic top plan view, in part similar to FIG. 2, showing another embodiment of the invention.

In the embodiment of FIGS. 1 through 5, the plural intake passages were used in conjunction with an engine of the type having two intake valves for each cylinder. Of course, the invention may be used in conjunction with an engine in which only a single intake valve is used for each cylinder. Such an embodiment is shown in FIG. 6 wherein the engine induction system is only illustrated. It is believed that only this portion of this embodiment need be illustrated since the application of it to the complete motorcycle is believed to be readily apparent to those skilled in the art.

The engine constructed in accordance with this embodiment of the invention is identified generally by the reference numeral 151. The engine 151 is of the single cylinder type and has a combustion chamber 152 in which a single intake port 153 and single exhaust port 154 are provided. Respective intake and exhaust valves 155 and 156 control the flow through the ports. The exhaust port 156 serves a cylinder head exhaust passage 157 which as in the preceding embodiment discharges into an exhaust pipe.

In this embodiment, a pair of cylinder head intake passages 158 and 159 serve the single intake port 156. The passages 158 and 159 are served by intake pipes 52 and 53 as in the preceding embodiment. The remaining components including the carburetor are the same as the embodiment of FIGS. 1 through 5 and for that reason these components have been identified by the same reference numeral and will not be described again. In addition, the operation of this embodiment also will not be described because it is believed to be readily apparent to those skilled in the art and is the same as the previously described embodiment.

In the embodiments described and illustrated, a two-barrel staged carburetor was employed. It is to be understood that the invention may be used in conjunction with two single barrel type carburetors that are operated in staged sequence. Alternatively, each intake passage may be served by a respective two-barrel carburetor.

In the embodiments described, only a single cylinder engine has been illustrated. It is to be readily understood that the invention may be used with engines having two or more cylinders by employing plural intake passages with separate carburetor barrels for each of these intake passages. Also, although the invention has been described in conjunction with two intake passages for each chamber, it is to be readily understood that it may be used in conjunction with engines having more than two intake passages per chamber.

In all embodiments, the arrangement permits a very compact arrangement by permitting individual carburetors to be smaller than those previously employed and also permits the use of piston type throttle valves without interference with the remaining components of the engine and without compromises in design. Furthermore, the staging of the carburetors permits good performance throughout the entire engine speed and load ranges.

Various other changes and modifications than those specifically described and illustrated may be made without departing from the spirit and scope of the invention, as defined by the appended claims.

I claim:

1. In a motorcycle having a rear wheel, a suspension for supporting said rear wheel for relative movement including a single suspension element extending generally in the longitudinal center plane of said motorcycle, a seat supported at least in part above said suspension element, and an engine having a combustion chamber and disposed forwardly of said rear wheel, the improvement comprising said engine having a pair of induction passages serving said combustion chamber, said induction passages lying in side-by-side relationship and extending rearwardly from said engine toward said rear wheel and lying at least in part on opposite sides of said single suspension element, charge forming means for delivering a fuel/air mixture to said induction passages, first and second throttle valves means in respective of said induction passages, and a crossover passage extending between said induction passages downstream of said throttle valves.

2. In a motorcycle as claimed in claim 1 wherein the charge forming means comprises a carburetor.

3. In a motorcycle as claimed in claim 2 wherein the carburetor has a pair of barrels each serving a respective one of the induction passages.

4. In a motorcycle as claimed in claim 3 wherein the flow through the carburetor barrels is controlled by throttle valve means operated in staged sequence so that one of the induction passages primarily serves the combustion chamber at low speeds and both of the induction passages serve the chamber at high speeds.

5. In a motorcycle as claimed in claim 1 wherein the throttle valve means are operated in sequence so that one of the induction passages primarily serves the combustion chamber at low speeds and both of the induction passages serve the chamber at high speeds.

6. In a motorcycle as claimed in any of claims 1 through 4 or 5 wherein the suspension element extends generally between and above the induction passages.

7. In a motorcycle as claimed in claim 6 wherein the suspension element comprises a shock absorber and surrounding coil spring.

8. In a motorcycle as claimed in claim 6 wherein the induction passages each serve the combustion chamber through respective intake ports and intake valves.

9. In a motorcycle having a rear wheel, a suspension for supporting said rear wheel for relative movement including a single suspension element extending generally in the longitudinal center plane of said motorcycle, a seat supported at least in part above said suspension element, and an engine having a combustion chamber disposed forwardly of said rear wheel, the improvement comprising said engine having a pair of induction passages serving said combustion chamber, said induction passages lying in side-by-side relationship and extending rearwardly from said engine toward said rear wheel and lying at least in part on opposite sides of said single suspension element, charge forming means for delivering a fuel/air mixture to said induction passages, said induction passages serve said combustion chamber through a common intake port.

* * * * *